US010587562B2

(12) United States Patent
Pikor

(10) Patent No.: US 10,587,562 B2
(45) Date of Patent: *Mar. 10, 2020

(54) ADVICE AND POLLING METHODS AND SYSTEMS

(71) Applicant: Jennifer Lynn Pikor, Dunstable, MA (US)

(72) Inventor: Jennifer Lynn Pikor, Dunstable, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/987,567

(22) Filed: May 23, 2018

(65) Prior Publication Data
US 2018/0270185 A1 Sep. 20, 2018

Related U.S. Application Data

(63) Continuation of application No. 15/270,872, filed on Sep. 20, 2016, now Pat. No. 10,009,309.

(51) Int. Cl.
G06F 3/0482 (2013.01)
H04L 12/58 (2006.01)
G06F 3/0484 (2013.01)
G06F 3/0488 (2013.01)
G06Q 30/02 (2012.01)

(52) U.S. Cl.
CPC .......... H04L 51/32 (2013.01); G06F 3/0482 (2013.01); G06F 3/04845 (2013.01); G06F 3/04847 (2013.01); G06F 3/04883 (2013.01); G06Q 30/0277 (2013.01); H04L 51/10 (2013.01)

(58) Field of Classification Search
CPC combination set(s) only.
See application file for complete search history.

(56) References Cited

U.S. PATENT DOCUMENTS

| 8,095,432 | B1 | 1/2012 | Berman et al. | |
| 9,196,003 | B2 | 11/2015 | Argue et al. | |
| 2008/0298386 | A1* | 12/2008 | Fiatal | G06Q 30/02 370/449 |
| 2010/0105456 | A1* | 4/2010 | Marufuji | A63F 13/12 463/9 |
| 2010/0332283 | A1 | 12/2010 | Ng et al. | |
| 2011/0318723 | A1* | 12/2011 | Jeong | G09B 7/08 434/350 |
| 2012/0265635 | A1 | 10/2012 | Forsblom | |
| 2013/0117378 | A1 | 5/2013 | Kotorov et al. | |
| 2013/0122481 | A1* | 5/2013 | Rovner | G09B 7/02 434/350 |
| 2013/0132221 | A1 | 5/2013 | Bradford et al. | |

(Continued)

FOREIGN PATENT DOCUMENTS

WO 2013192557 6/2013
WO 2015048141 4/2015

Primary Examiner — Hien L Duong
(74) Attorney, Agent, or Firm — Lambert Shortell & Connaughton; Gary E. Lambert; David J. Connaughton, Jr.

(57) ABSTRACT

A computerized polling system is provided. The polling system allows a polling user to ask a question posed to a plurality of answering users. The first user asks the questions and provides two or more graphical representations, each representation corresponding to one of the potential answers to the question. The system receives answers from the answering users and tallies them, providing a result with indications of how the answering users have answered, such as a percentage marking.

20 Claims, 16 Drawing Sheets

(56) References Cited

U.S. PATENT DOCUMENTS

| | | |
|---|---|---|
| 2014/0032667 A1 | 1/2014 | Wright |
| 2014/0081804 A1* | 3/2014 | Nuzzi ................ G06Q 30/0601 |
| | | 705/26.41 |
| 2014/0324957 A1 | 10/2014 | Li |
| 2015/0058238 A1* | 2/2015 | Milley .................... H04W 4/21 |
| | | 705/319 |
| 2015/0237080 A1 | 8/2015 | Horvath |
| 2016/0110795 A1* | 4/2016 | Farrar ................ G06O 30/0631 |
| | | 705/26.7 |
| 2017/0064033 A1* | 3/2017 | Stackel ................ H04L 67/306 |
| 2017/0169463 A1* | 6/2017 | Couvillon .......... G06Q 30/0245 |

* cited by examiner

ADVICE AND POLLING METHODS AND SYSTEMS

BACKGROUND OF THE INVENTION

Field of the Invention

The present invention relates generally to an peer-based research system. More particularly the present invention relates to a system that allows users to upload image files corresponding to various answers to a question, and to pose this question to a plurality of known answering users, and to relay the answers received to the question-asking user.

Description of Related Art

It is very common in many people's daily lives to seek advice from others. For example, frequently we all ask family, friends, colleagues, and sometimes strangers for their opinion on a particular question—what to buy, what to eat, where to go for something, and so on. Further, often the advice or answers to a question are solicited from a number of different people to aid in the formation of opinions and decisions. While direct contact with advisors is handy, it can be time consuming. Further, given the amount of social interaction now performed remotely via social media systems, often communication with large groups of contacts is possible without direct individual contact.

Therefore, what is needed is a computerized system that provides a platform to allow users to instantly and simultaneously ask any number of people, such as social media contacts, for their opinion in visual format.

SUMMARY OF THE INVENTION

The subject matter of this application may involve, in some cases, interrelated products, alternative solutions to a particular problem, and/or a plurality of different uses of a single system or article.

In one aspect, system for polling is provided. This system typically is used for polling social media contacts, but not necessarily so. The system includes an interface that allows a user to sign up to both receive and submit polling. The system utilizes a computerized device for a poll-answering user that has a processor coupled to the interface. The processor is operable to determine available polls for the first user in response to receiving the request for polling access. The processor may then cause the interface to display a first poll on a graphical user interface of the computerized device. The first poll comprises a question to the first user, as well as a first and second graphical representation of a first and second poll answer.

The first poll is created by a second user using a second interface in communication with a processor of the second user's computerized device. The computerized devices of the first and second user are in networked communication. Typically this communication will be a networked communication through a system server, such as wireless network communication. The second user may create the poll by inputting the question, selecting a first image, animated image (such as an animated GIF file), or video as the first graphical representation, selecting a second image, animated image (such as an animated GIF file), or video as the second graphical representation, and selecting a group of users to present the poll to. Any user in the selected group may operate as an answering user should they choose to.

The processor of the first answering user's device may further determine that the interface has received a selection of one of the graphical representations corresponding to a poll answer. This determination may be achieved by detecting that the answering user performed a gesture associated with the one of the plurality of graphical representations displayed on the graphical user interface. Once selected, the system, through the processor may record the selected poll answer corresponding to the selected graphical representation. Optionally this recorded poll answer may be sent to a centralized computer server. In response to the determined selection of the one of the plurality of poll answers, the processor automatically causes the graphical user interface to display a notification of receipt of the selection. The system further communicates the selected poll answer to the second polling user.

DETAILED DESCRIPTION

Figure 1:
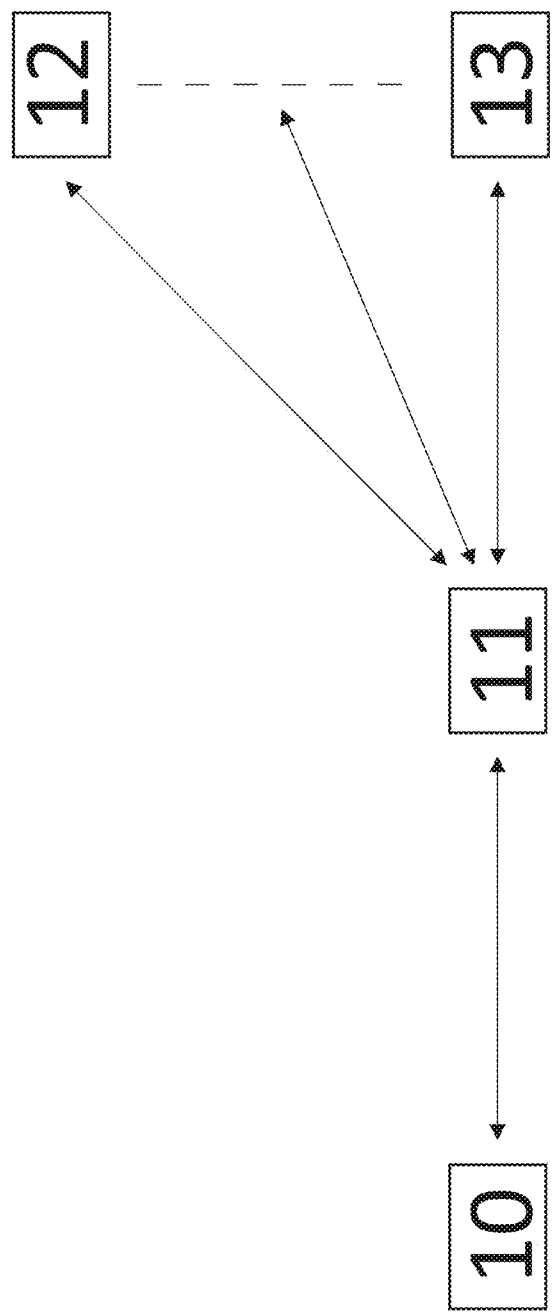
FIG. 1 provides a schematic view of networked components of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

The present invention is a computerized operational system that solves a computer-specific, internet-centric problem of soliciting advice from a number of different social media connections. Further, the present invention provides a unique graphical user interface system that allows for an enhanced operability of the advising and polling system.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, as a computer program product embodied in any tangible medium of expression having computer-usable program code stored therein. For example, some embodiments described below with reference to flowchart illustrations and/or block diagrams of methods, apparatus (systems), and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The present invention utilizes a computerized system to solve a number of technical problems that are significantly more than generic computer functions. For example, the system solves the computer-based problem of simultaneous polling of multiple users and automatic notification and result analysis. In the prior art, a user would need to directly contact the person via phone, email, text message, and the like, and then weigh their direct suggestions individually. However, in the present invention, the system automatically communicates poll questions having a unique graphical user interface, and then automatically analyzes the poll answer data from a plurality of users. This provides better computerized functionality of the user device because it solves the above noted technical problem, causes the device to operate more effectively, and addresses the internet specific problem of automated communications. Indeed, the system may provide notifications to devices of multiple users and may provide real time tracking of polling actions and answers. This real time tracking of the polling activity may be displayed to system users through a graphical user interface which may be updated frequently. Further, the system utilizes graphical user interface(s) to allow users and customers to operate the systems in unique, new, and non-obvious ways.

This invention performs a number of operations that could not be performed by a human using mental steps or pen and paper. For example, a non-computerized system could not automatically determine that a touch screen gesture has been received corresponding to one of a plurality of graphical representations on a user interface.

Generally, the system of the present invention provides a personalized, peer-based polling and advice system. The system includes an interface configured to allow a user to sign up and offer their advice or to ask connections for advice. A computer processor is in communication with the interface. Once signed up, the processor may determine available polls for the user based on the user's connections, and other users who have made polls available either directly to the user or publicly.

A user may select a poll through a graphical user interface, at which point the processor causes the interface to display the selected poll. In the present system, the poll comprises display of a question to the user, a first graphical representation corresponding to a first poll answer, a second graphical representation corresponding to a second poll answer, and additional graphical representations for each additional potential poll answer. Generally the poll will have two possible answers, but it should be understood that in varying embodiments, more than two answers may be available.

A poll is created by another system user who poses the question. The polling user may create this poll simply by inputting a question, and then selecting two or more photos, videos or other graphical representations corresponding to the two or more answers to the inputted question. The photos or videos may be selected from a storage memory of the computerized device being used to create the poll, may be sourced from a networked database, or may be created by the user by a digital camera taking photographs or videos relating to the different poll answers. This polling user may then select a group of system users to present the poll to.

In one embodiment, a website having a plurality of image files may contain a link to cause a processor of a user computerized device to automatically input a graphical representation corresponding to the link into the system as one of the graphical representations. For example, on a fashion website that sells shoes, a user may actuate a first link through their computerized user interface corresponding to a first pair of shoes. This actuation causes the processor of the computerized device to automatically input this image from the website into the system's graphical user interface for preparing the question. Next a second link corresponding to a second pair of shoes may be actuated, causing the processor to automatically input the second image from the website into the system's graphical user interface for preparing the question.

In answering the poll, the system user will interact with the graphical user interface to identify one of the graphical representations corresponding to the poll answer. This interaction may be performed in any manner. In many embodiments, the interaction it will be received by the processor determining that a gesture was received through a touch screen interface in relation to one of the graphical representations.

Examples of gestures the touch screen system may receive include any of a tap, swipe, double tap, circle motion, two finger pinch or expand, and the like.

Once the processor identifies the gesture on the touch screen, it may record the selected answer, and transmit this information to a remote server or remote memory storage for processing via a networked connection. The answer selected may be grouped with other user answers, and then the data may be processed and tallied. Further, the processor may automatically display to the user confirmation of receipt of the user's selected answer. In one embodiment, this may be displayed by the graphical user interface providing a check or other visual indication of selection.

Based on the processing and tallying, the remote server may in varying embodiments send the polling results to one or both of the polling user and poll answering users. When received by either user, information regarding the poll answers may be provided including what individual users selected, and also what percentage of the answering users selected what answer.

In a particular exemplary embodiment, the present invention may be particularly useful for polling users on what clothing, shoes, or apparel items should be worn or bought. For example, someone who is torn between two dresses to wear may put each on, take a photo with each on, and then pose the question of what dress to wear to a group of users. This may be done similarly when choosing a clothing item for purchase.

In some embodiments, the processor may utilize a wireless transmitter to receive new poll questions for the user as they are created by a polling user. The processor may then cause the graphical user interface to display an indication that a new poll is available and who the polling user is.

The system of the present invention may further allow for interaction between the polling user and answering user directly. For example, this interaction may be in the form of a texting communication through the system. In one embodiment, this may be implemented on the user's computerized device by the processor causing the graphical user interface to display a text area and a keyboard. The keyboard is operable by a receipt of a gesture on a representation of a key, this instructs the processor to display the series of letters "typed" in the text box. A gesture on a send button may then cause the processor to transmit this message from the polling user to the answering user or vice versa. This transmission may be performed either through a centralized system operating server-based communications, or directly between users using a cellular, cellular data, or other similar networked connection.

In many embodiments, the poll may have a time limit for receiving answers. This time limit may be selected by the polling user when setting up the poll, and may be short—a matter of minutes, or may be over a long period of time—days or weeks. The time limit may or may not be displayed to the polling users, but once the time limit expires the system is configured to stop making the poll available and to stop receiving votes from the poll.

The processor of the answering user's computerized device may enable the user interface to zoom in on the graphical representations of each poll answer upon receiving a zoom gesture. The zoom gesture may be any predetermined gesture made on the touch screen. Upon receipt of the zoom gesture corresponding to the one of the graphical representations, the particular representation may be shown in a zoomed in view which may take up more, or all, of the real estate on the graphical user interface.

In a particular embodiment, the system of the present invention may utilize advertisements to generate income for the system's operational costs and profits. One embodiment of advertisement may be in the form of a second poll question presented by an advertiser before or after the poll from the polling user is answered. For example the processor of the answering user's device may cause the graphical user interface to display an advertiser poll. This poll may comprise an advertiser question, and two or more graphical representations corresponding to each possible poll answer. The information for this poll may be sent to the answering user's computerized device through a networked communication with a server which stores and selects these advertiser polls. The processor may determine that a gesture has been received on the touch screen corresponding to the advertiser's graphical representation, resulting in a recorded answer. This recorded answer may be logged and transferred to the server. Advertisers may manually create these polls, or they may be automatically made by a computerized systems. In some embodiments, the system may target advertisements to various users based on their interests, and data mined from the centralized server's stored memory, including data relating to selected poll answers, personal information provided during sign up, selected items that were purchased through using the system, and the like.

In some embodiments, after the polling user receives the feedback and advice from the plurality of answering users, they may make a selection. Of course, this selection may run counter to a majority of the answering users' advice in some cases. The polling user may, once their own decision is made, identify to the system user interface what their final choice was. The system may further cause the processor of the answering user device to display information relating to what answer the polling user ended up picking, and to display if the polling user agreed with the answering user's selection.

The system may be configured to group a polling user's contacts automatically into different groups. This typically may be done by a system server which tracks the polls of the system, records answering user answers, and records polling user selections. For example, the system may calculate a percentage correct rate of the answering user to a particular polling user, and/or a percentage correct rate overall for different polling users. The system may further allow polling users to view an answering user's percentage correct rate. The system may be configured to automatically group the answering users having similar success rates within a predetermined range together. The answering user may then identify this group of users and select individuals or the entire group to pose a question or poll to. Similarly, the system may automatically group users together who have a success rate greater than a predetermined rate.

Turning now to FIG. 1, a schematic view of components of an embodiment of the present invention is provided. In this view, a server 11 is in communication with a polling user's computerized device 10. The polling user may utilize a user interface on her computerized device to input the poll question, and may use a camera of the computerized device to input and upload photos or videos. Once the poll is prepared (including the question and the graphical representations of each answer), the poll is uploaded through a network such as the internet to the server 11. A plurality of answering users may access this poll by communication with server 11 by their computerized devices 12-13 (and many more possible as indicated by broken line). These answering users may utilize the user interface of their computerized devices to select a poll answer by gesturing over the graphical representation corresponding to their selected poll answer. This gesturing may be performed on a touch screen, or on a computer using a mouse, touch pad, and the like.

Figure 2:
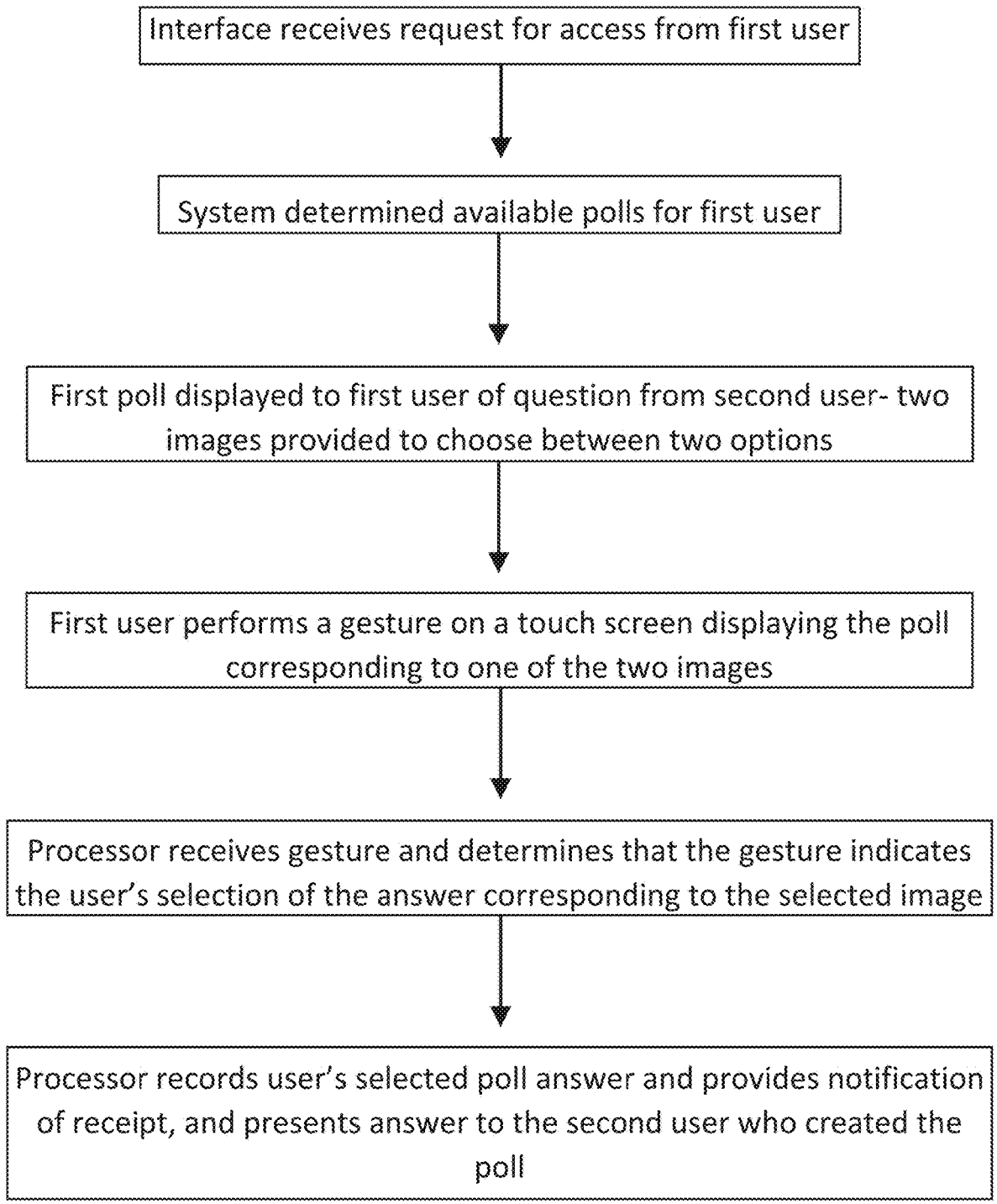
FIG. 2 provides a flow chart of an embodiment of the present invention.

FIG. 2 provides a view of a flow chart of an embodiment of the present invention detailing operation of a first answering user. Initially, the first user may provide a request for access from the first user to access the polling system. This request may be initiated through the user interface of the system on the first user's computerized device. Upon receiving this request, the computerized device sends the request through a networked connection to the system server. The system may then determine available polls for the first user, which include polls that are intended for the first user by a second polling user. The system may then send this information to the computerized device of the first user. A first poll is displayed to the first user from a second user. This display is performed on a computerized user interface and includes a question and two images, each image representing one answer to the question. To answer the polled question, the first user performs a gesture on, in this embodiment, a touch screen that is also displaying the poll on the user interface. The gesture is received corresponding to the image, and the computerized device records this information. The processor of the computerized device identifies the received gesture and determines that it indicates the first user's selection of the answer corresponding to the selected graphical representation. This is recorded, a notification of receipt is shown on the graphical user interface of the first user's computerize device, and the answer is communicated from the computerized device, to the server, and from the server to a computerized device of the second user.

Figure 3:
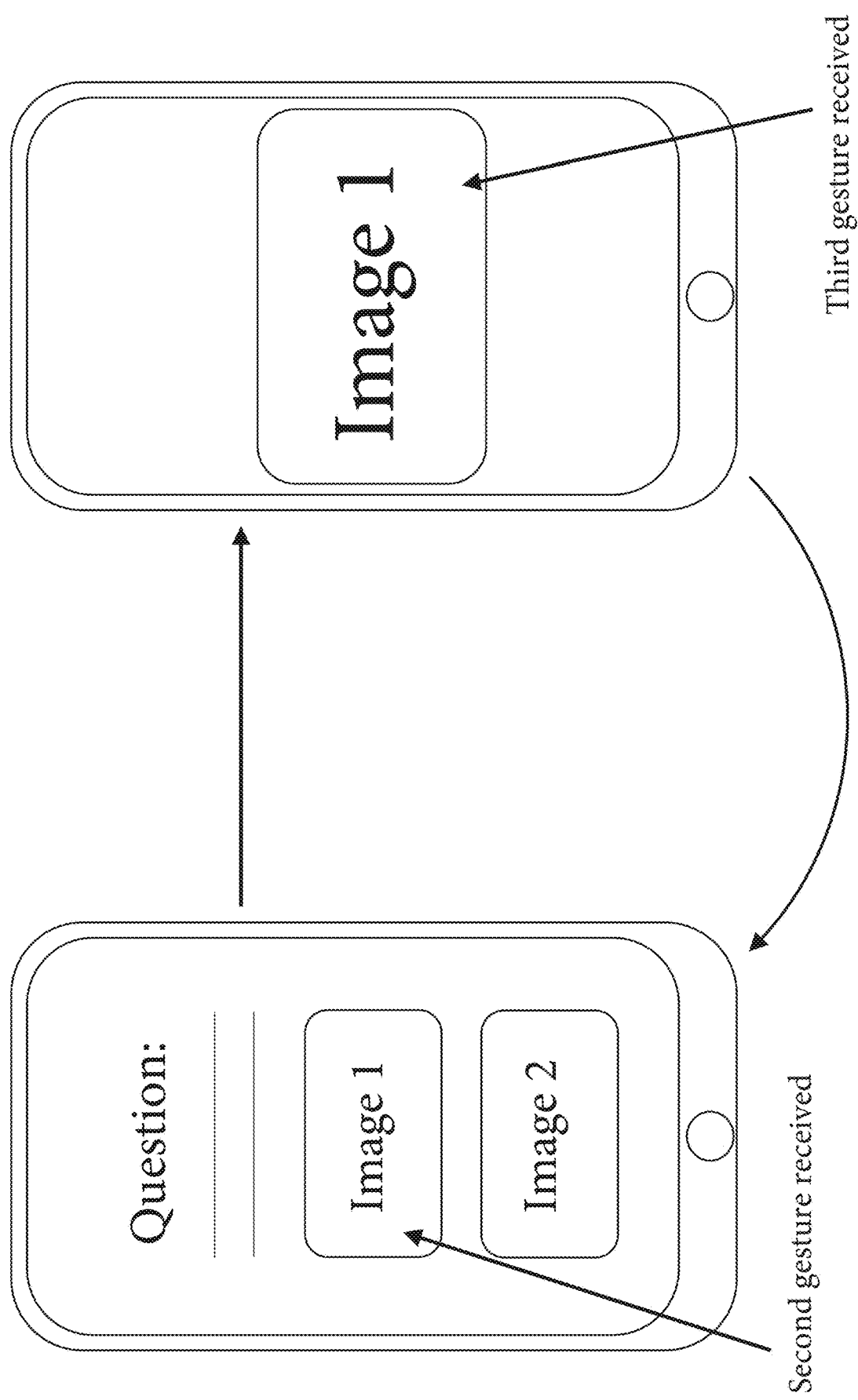
FIG. 3 provides a view of an embodiment of operation of the present invention.

FIG. 3 provides a view of an operation of an embodiment of the present invention through which a zoom process of one of the two images displayed is achieved. In this embodiment, initially a question is posed to a first polling user on the graphical user interface of their computerized device—in this view: a smart phone. As discussed above, a receipt of a first gesture on the user interface may select the image as the selected poll answer. Further, in the embodiment shown, a second gesture on the graphical user interface may result in a zoomed in view. Here, the second gesture is received on Image 1, and in turn this image is displayed largely on the display. Upon receipt of a third gesture on the zoomed in image 1, the graphical user interface may return to its original state displaying the question and the two images. Examples of potential second gestures may include a double tap on a touch screen, a two-fingered motion of the fingers moving away from each other, a two fingered tap, and the like. Examples of potential third gestures may include a double tap, a two-fingered pinching motion, and the like.

Figure 4:
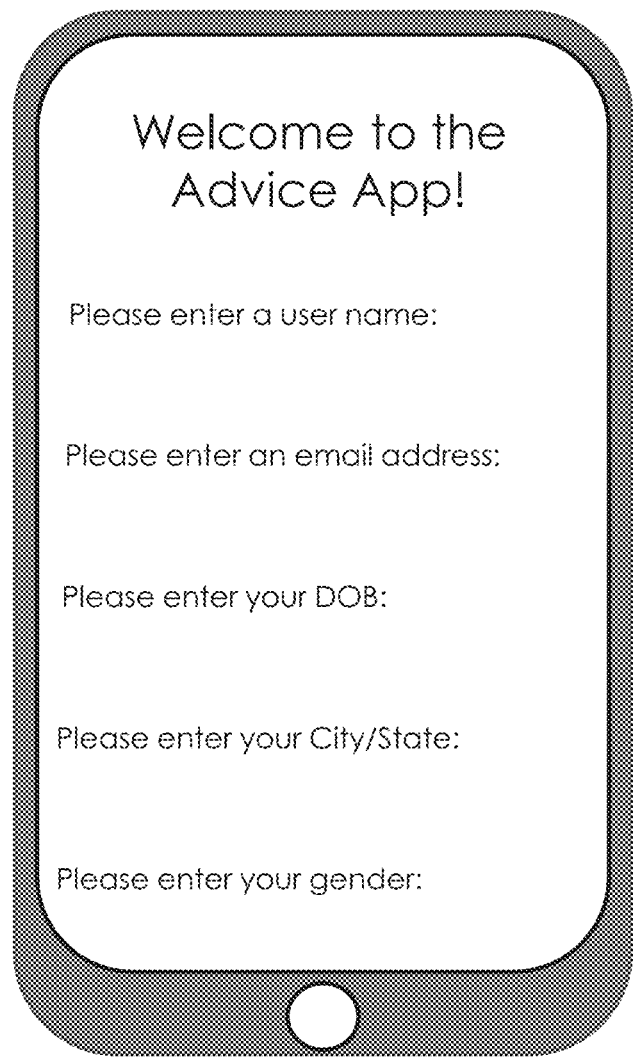
FIG. 4 provides a view of an embodiment of implementation of the present invention.

FIG. 4 provides a view of a user interface that allows input of registration information into a user interface of the system. A new user may input personal information to register for an account. This information may include, but is not limited to entry of a user name, email address, date of birth, city and state, and gender. In the user interface, under or otherwise adjacent to the entry prompts is a text box or area in which a user may input the information through the user interface.

Figure 5:
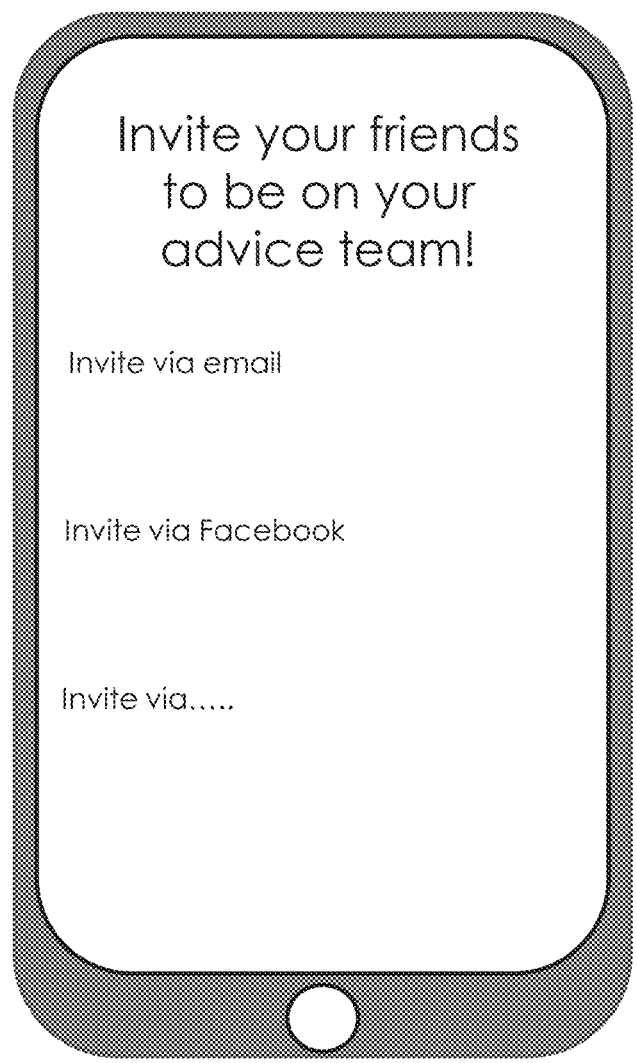
FIG. 5 provides a view of another embodiment of implementation of the present invention.

FIG. 5 provides a view of an embodiment of the user interface which allows users to invite others to be users of the system. This may be achieved by the computerized system accessing a stored list of email contacts, a stored list of Facebook® or similar social network contacts, manual invitation, and the like.

Figure 6:
FIG. 6 provides a view of yet another embodiment of implementation of the present invention.

FIG. 6 provides a view of the user interface that allows a polling user to select a group or groups in which an "advice team" member, which is to say a system user who is a connection to the user, belongs to. In this view, the user is in an "everyone" group, a "fashion team" group, a "relationship team" group, and a "gardening" group. The connection may be put in groups that the user values the connection user's opinion on. For example, a connection may be particularly stylish, which would lead a user to want them on the "fashion team" to gather advice on certain fashion styles or items.

Figure 7:
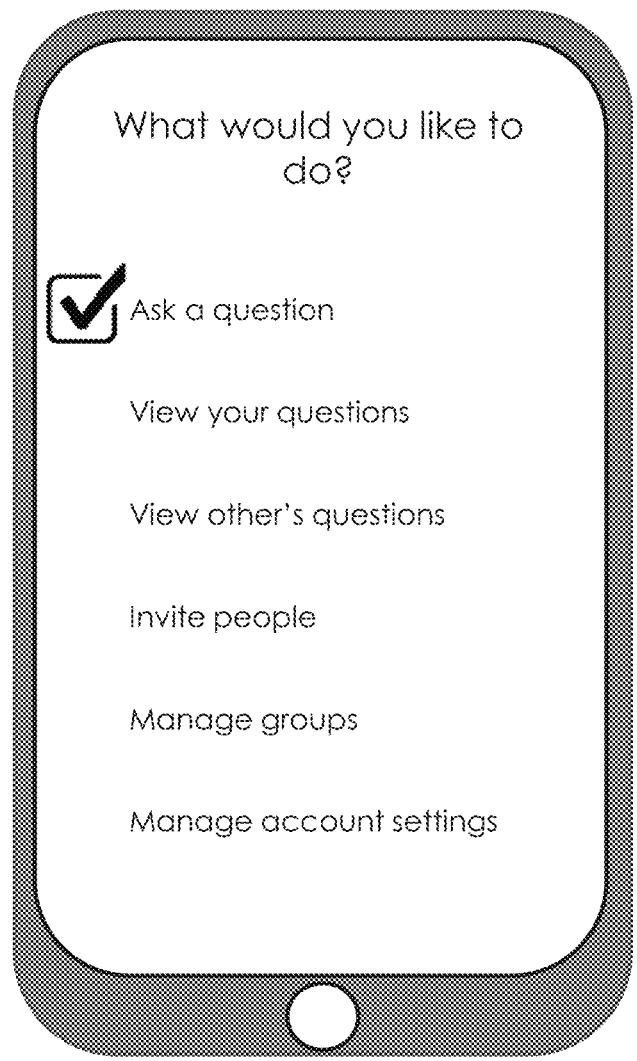
FIG. 7 provides a view of another embodiment of implementation of the present invention.

FIG. 7 provides a view of an embodiment of a main screen of the user interface. In this embodiment, the user interface may be accessible by a touch screen configured to receive various gestures to cause a processor to initiate the different functionalities of the computerized device. For example, if a gesture is received by the "Ask a Question" area, the system may initiate, using the computerized processor, a new user interface screen that is described above for preparing a poll question. Similarly, if a gesture is received by the "View other's questions" area, the system may initiate, using the processor, a user interface screen described above for viewing a poll question. This viewing of the poll question, as noted previously, may include a question, and graphical representations of varied answers.

Figure 8:
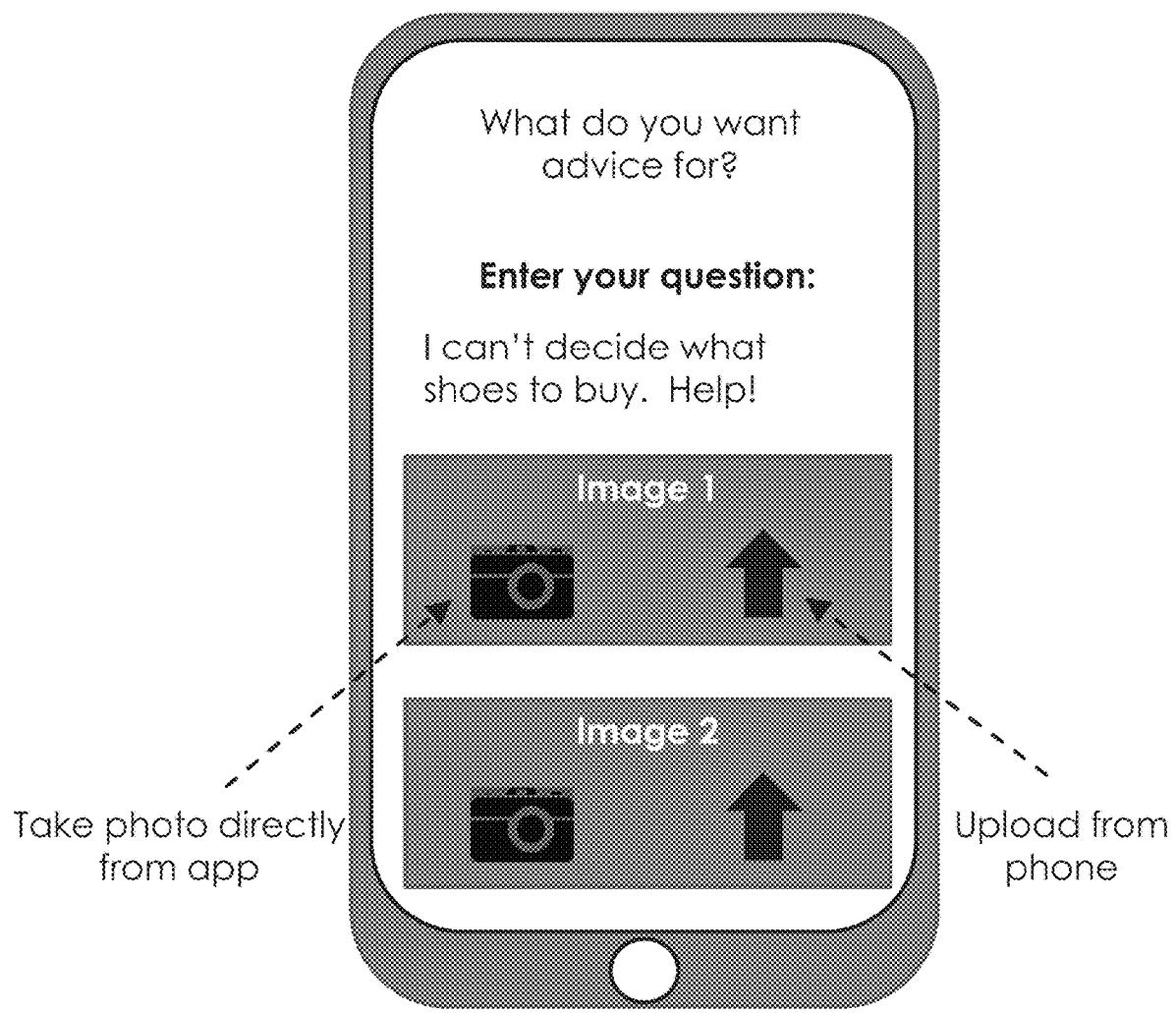
FIG. 8 provides a view of an embodiment of preparation of a question for polling.
Figure 9:
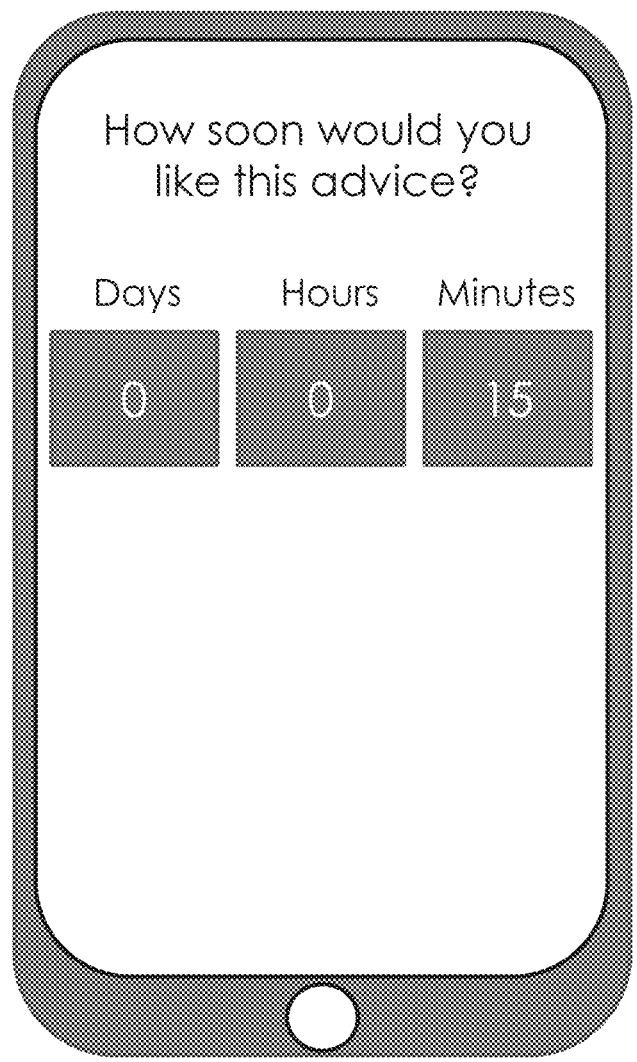
FIG. 9 provides a view of another embodiment of preparation of a question for polling.
Figure 10:
FIG. 10 provides a view of yet another embodiment of preparation of a question for polling.

FIG. 8 provides an exemplary embodiment of a user interface view when a user is preparing a poll question. The question can be entered. Then, a first and second image may be uploaded or taken using a camera of the computerized device. In FIG. 9, an embodiment of a user interface of the system shows how a user may set a time frame for the poll advice to be set, in increments of minutes, hours, and days. In FIG. 10, a view of an embodiment of how the polling user selects to whom the poll is to be sent is provided. Here, the polling user has selected to solicit feedback from all of her contacts.

Figure 11:
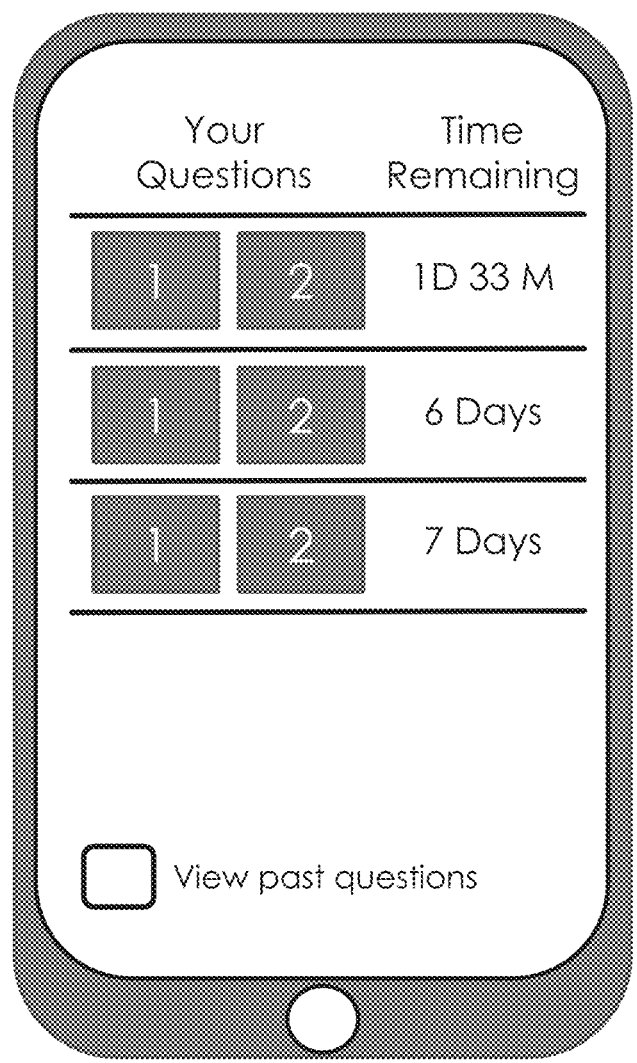
FIG. 11 provides a view of a list of pending poll questions presented by a user.
Figure 12:
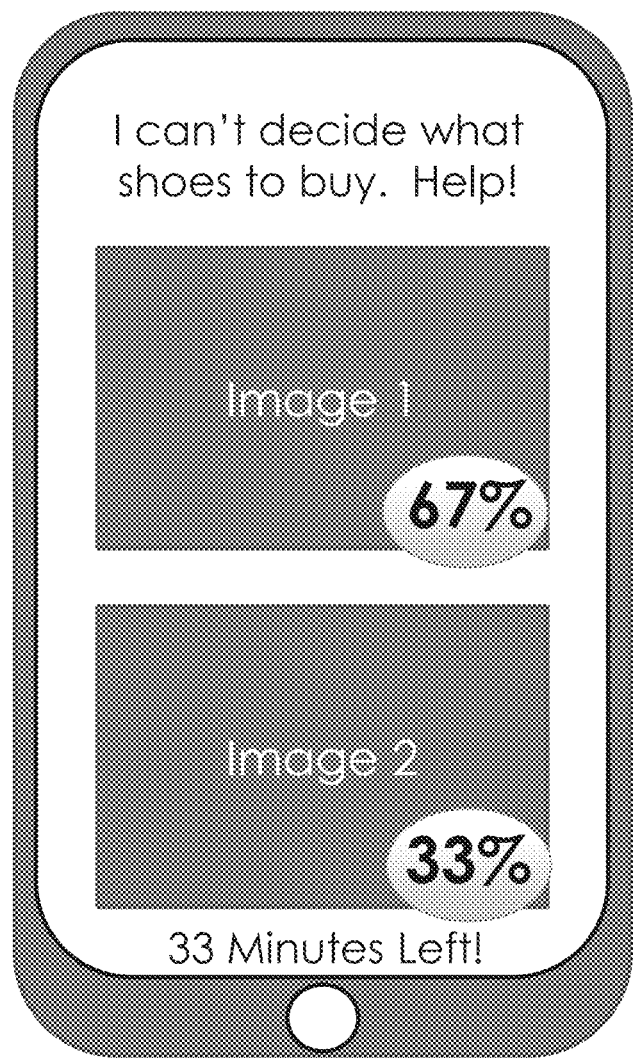
FIG. 12 provides a view of an embodiment of the system displaying polling results.
Figure 13:
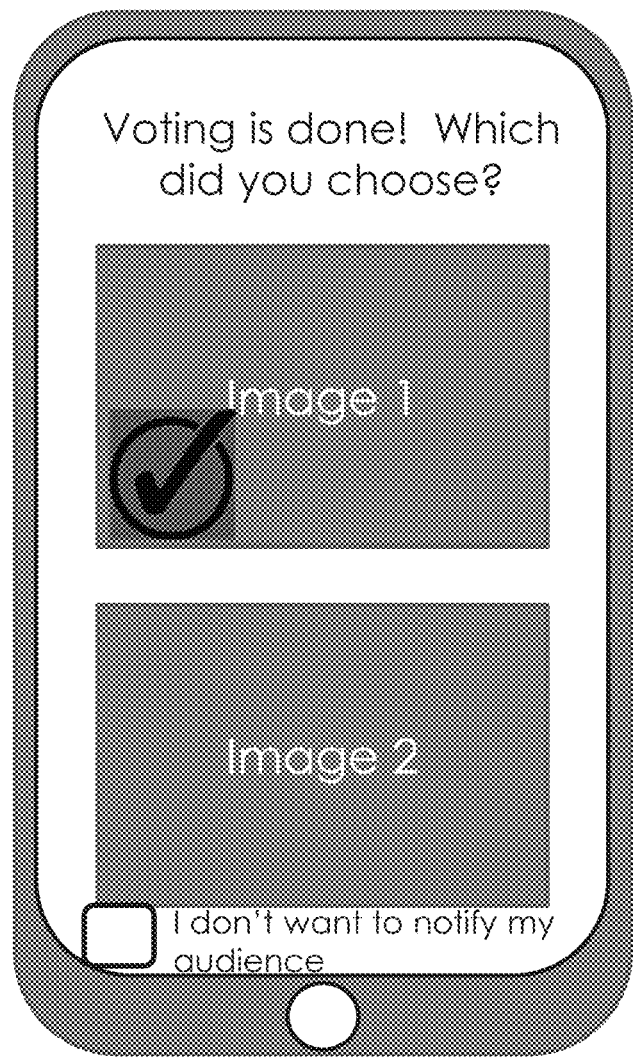
FIG. 13 provides a view of an embodiment of the system showing a selection of what result was chosen.

FIG. 11 demonstrates an embodiment of how a user may view a list of their pending questions. These questions may be displayed in a list view such that the graphical representations of the potential answers are listed in a small view, along with the time remaining. The system may further allow users to review past questions as well as the poll results. These poll results may be shown as, for example, percentage selection for each option. Past polls may also include an indication of what selection the polling user ended up making. An example of polling results as well as time left of a particular question can be seen in FIG. 12. A similar result may be presented for past question results as well, having a percentage representation adjacent to each graphical representation of an answer. FIG. 13 provides another view of the polling results allowing a polling user to indicate, either to the system or to the answering users, which option was selected. The selected option may or may not be what the polling users chose.

Figure 14:
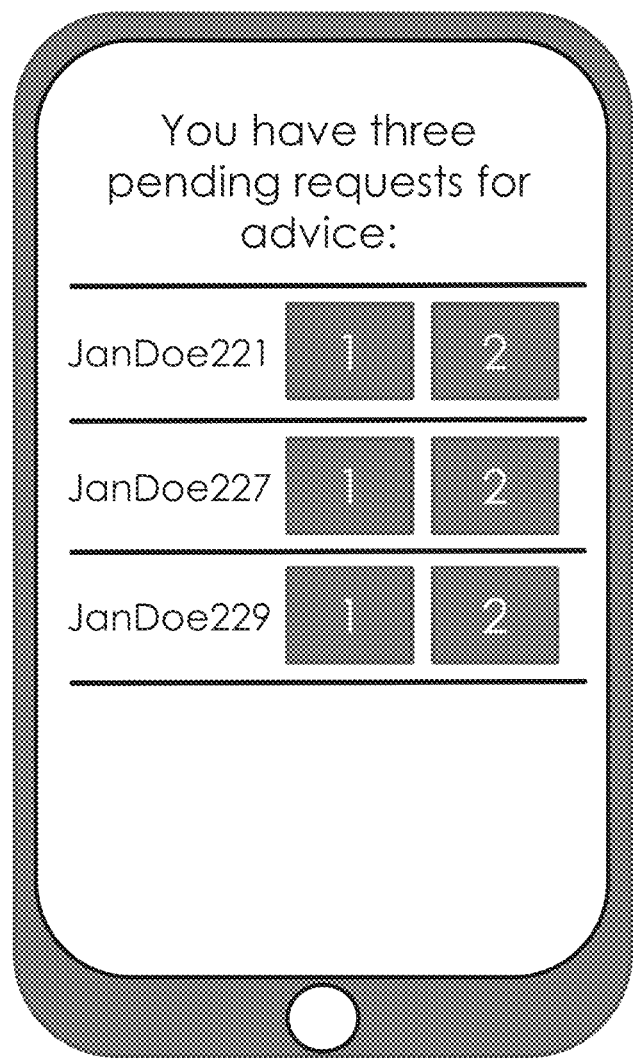
FIG. 14 provides a view of an embodiment of the system in use to display potential questions which a user can use the system to answer.
Figure 15:
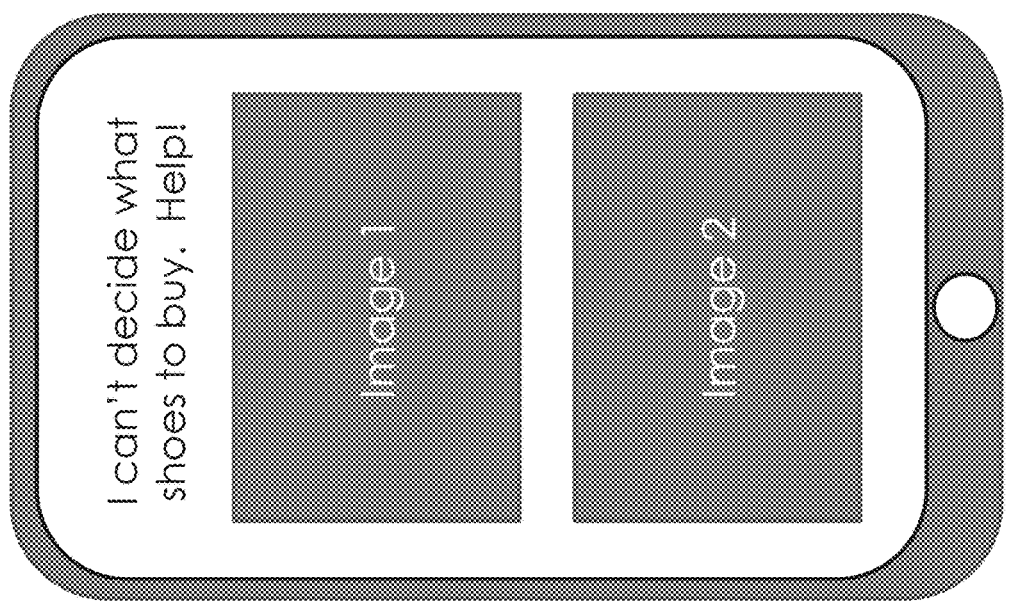
FIG. 15 provides a view of a question for answering through the system of the present invention displayed on a user interface.
Figure 15:
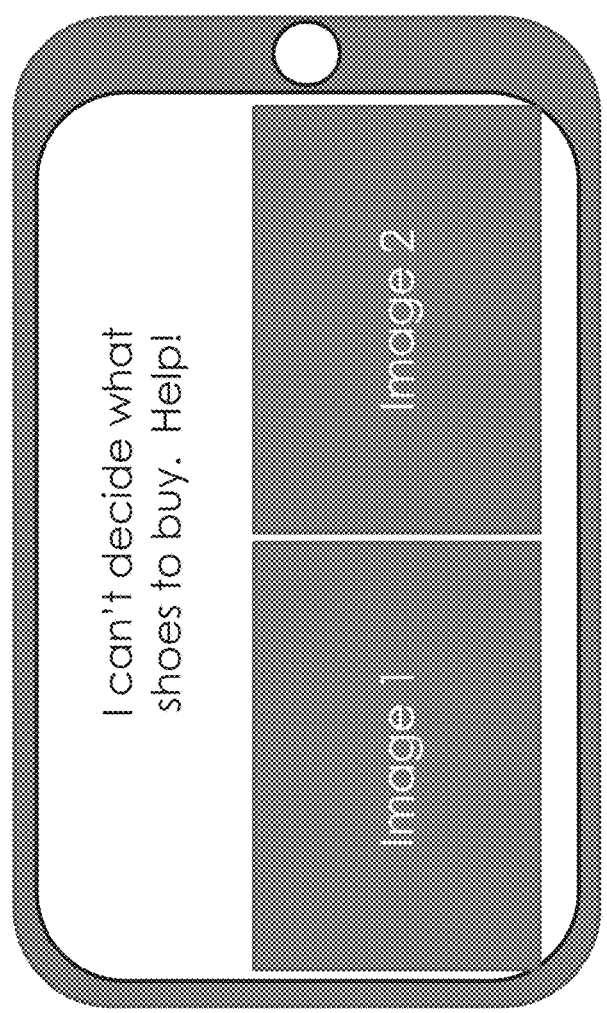
Figure 16:
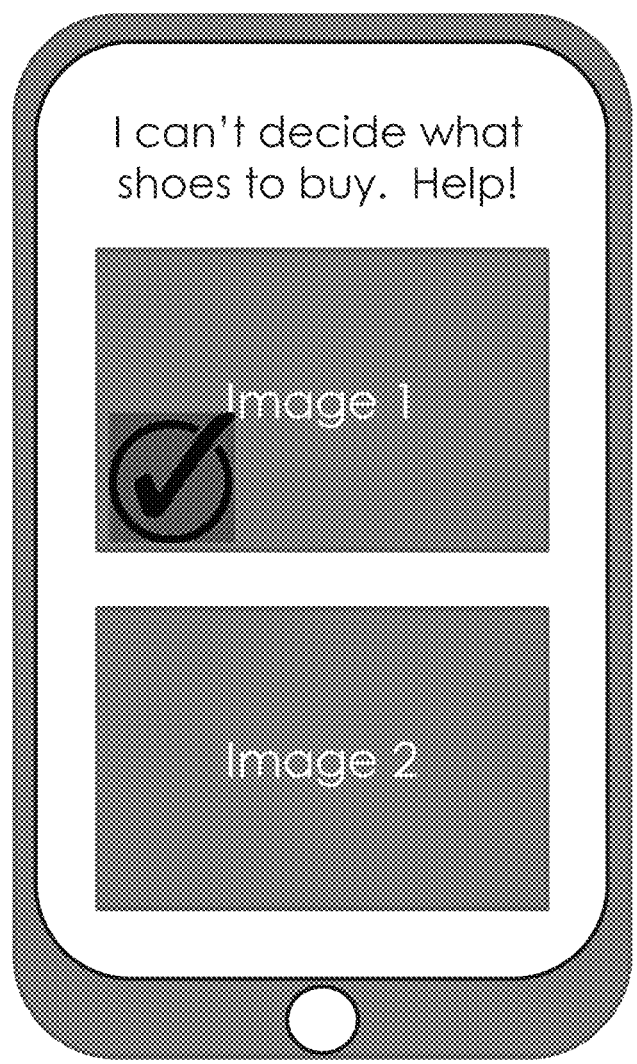
FIG. 16 provides a view of a selected answer of a question for answering through the system of the present invention displayed on a user interface.

FIG. 14 shows an embodiment of an aspect of the invention that allows a user to view various questions that they have been requested to answer. The user may select a particular question to receive a larger view. In the list view, a smaller list of the questions available are shown displaying small graphical representations of the options, and a note from whom the question request is sent. Upon selecting a question through the list interface, the user interface displays the question at hand. FIG. 15 provides a view of a user interface displaying the question to be answered. In this view, the question is shown, along with two options, each option represented by a graphical representation. The graphical representations are typically a photograph or video. Upon receiving the gesture input of one representation, the processor of the computerized device displaying the question may cause the result to be recorded and transmitted to the server which collects the various results from various users. The processor may then cause the user interface to display a receipt of the selection. In the view shown in FIG. 16, the display is in the form of a check mark over the graphical representation selected.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A system for polling comprising:
   an interface operable to:
      electronically receive a request for polling access submitted by a first user using a first electronic device;
   a processor coupled to the interface and operable to:
      cause the interface to display a first poll, the first poll comprising:
         a question to the first user;
         a first graphical representation of a first of a plurality of poll answers;
         a second graphical representation of a second of the plurality of poll answers;
         wherein the first poll is created by a second user and presented to the first user;
      the processor further configured to determine that the interface has received a selection of one of the graphical representations of one of the plurality of poll answers by determining that the first user performed a gesture associated with the one of the graphical representations displayed on the interface;
      record the selected one of the plurality of poll answers corresponding to the selected graphical representation;
      in response to the determined selection of the one of the plurality of poll answers, automatically cause the interface to display a notification of receipt of the selection;
      wherein the processor is configured to receive an information from the second user identifying a selected choice of the plurality of poll answers, and configured to cause the interface to provide a graphical indication of the selected choice to the first user; and
      displaying to the first user through the interface a percentage correct rate of the first user based at least partially on the selected choice of the second user.

2. The system of claim 1 wherein the gesture associated with the interface is a tap of a touch screen.

3. The system of claim 1 wherein the notification displayed on the interface comprises a poll result showing a percentage of selection of the first poll answer and a percentage of selection of the second poll answer.

4. The system of claim 1 wherein the information from the second user is received by a networked connection.

5. The system of claim 1 wherein the second user creating the poll by inputting the question, selecting a first photograph or video as the first graphical representation, selecting a second photograph or video as the second graphical representation, and selecting a group of users to present the poll to, the first user being in the group of users, a remainder of the group of users being connections to the second user.

6. The system of claim 5 wherein the second user creating the poll further comprises inputting a time limit for the group of users to respond, wherein after the time limit expires, the first user cannot answer the poll.

7. The system of claim 1 wherein the processor is configured to cause the interface to provide an alert notification automatically when the first poll is available informing the first user of the first poll.

8. The system of claim 1 wherein, in response to the determination that the interface has received the selection, the processor is configured to enable communications between the first user and the second user, the enabling of the communication causing the interface to display to the first user a text area configured to receive text inputted by the first user to send to the second user.

9. The system of claim 1 wherein the processor is further configured to:
   after notification displayed by the interface, cause the interface to display a second advertisement poll from an advertiser user;
   the advertisement poll comprising:
      a question;
      a first graphical representation of a first of a plurality of advertisement poll answers;
      a second graphical representation of a second poll answer of the plurality of poll answers;
   wherein the advertisement poll is created by an advertisement user using a third interface in networked communication with the processor, the advertisement user creating the poll by inputting the question, selecting a first photograph or video as the first graphical representation, and selecting a second photograph or video as the second graphical representation;
   determine that the interface has received a selection of one of the graphical representations of one of the plurality of poll answers by determining that the first user performed the gesture associated with the one of the graphical representations on the interface;
   record the selected one of the plurality of poll answers corresponding to the selected graphical representation.

10. The system of claim 1 wherein a second processor is coupled to the second interface of the second user, the second processor configured to:
    compare the selected poll answer of the first user to the selected choice of the second user;
    calculate a percentage correct rate of the first user based on the comparison and a plurality of prior comparisons of selected poll answers by the first user compared to selected choices of the second user;
    cause the calculated percentage correct rate to be displayed on the interface.

11. The system of claim 10 wherein the second processor is configured to present the calculated percentage correct rate of the first user to the second user.

12. The system of claim 10 wherein the second processor is configured to automatically group the first user in a group of a plurality of users having a success rate within a predetermined range of each other, and configured to present this group to the second user as the group of users to which the second user presents a second poll.

13. The system of claim 1 wherein the first poll is limited such that the first user must select only one of the first poll answer and the second poll answer.

14. The system of claim 6 wherein the processor is configured to cause the interface to display a countdown timer based on the time limit.

15. The system of claim 1 wherein at least one of the first graphical representation and second graphical representation is a video.

16. The system of claim 1 wherein at least one of the first graphical representation and second graphical representation is a photograph.

17. A computerized polling method comprising the steps of:
    receiving a request for polling access submitted by a first user using a first electronic device through a user interface of an electronic device, the electronic device comprising the user interface, a memory, and a processor;
    the receiving causing the processor of the electronic device to display a first poll, the first poll comprising:
       a question to the first user;

a first graphical representation of a first of a plurality of poll answers;

a second graphical representation of a second poll answer of the plurality of poll answers;

determining, by the processor, that the user interface has received a selection of one of the graphical representations of one of the plurality of poll answers by determining that the first user performed a gesture associated with the one of the graphical representations displayed on the user interface;

recording, to the memory by the processor, the selected one of the plurality of poll answers corresponding to the selected graphical representation;

displaying, in response to the determined selection of the one of the plurality of poll answers, a notification of receipt of the selection;

receiving, by the processor, an input from the second user identifying a selected choice of the plurality of poll answers, and configured to cause the interface to provide a graphical indication of the selected choice to the first user; and displaying to the user, through the user interface, a percentage correct rate of the first user based at least partially on the selected choice of the second user.

18. The method of claim 17 further comprising the step of displaying, on the user interface, a poll result showing a percentage of selection of the first poll answer and a percentage of selection of the second poll answer.

19. The method of claim 17 further comprising the step of determining, by the processor, available polls for the first user in response to receiving the request for polling access.

20. A system for polling comprising:

an electronic device comprising an interface and a processor, the processor configured to receive a poll and display the poll on the interface, the poll comprising:

a question to the first user;

a first graphical representation of a first of a plurality of poll answers;

a second graphical representation of a second of the plurality of poll answers;

wherein the first poll is created by a second user and presented to the first user;

the processor further configured to determine that the interface has received a selection of one of the graphical representations;

wherein the processor is configured to receive an input from the second user identifying a selected choice of the plurality of poll answers, and configured to cause the interface to provide a graphical indication of the selected choice to the first user; and displaying to the first user through the interface a percentage correct rate of the first user based at least partially on the selected choice of the second user.

* * * * *